United States Patent
Charles et al.

(10) Patent No.: US 8,702,032 B2
(45) Date of Patent: Apr. 22, 2014

(54) COMPACT ELECTRIC TAXI ASSEMBLY FOR INSTALLATION ON AN AIRCRAFT

(71) Applicant: Honeywell International, Inc., Morristown, NJ (US)

(72) Inventors: David Lane Charles, South Bend, IN (US); Louie Timothy Gaines, Phoenix, AZ (US); Donald J. Christensen, Phoenix, AZ (US); John Brian Dempster, Floyds Knobs, IN (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 13/929,204

(22) Filed: Jun. 27, 2013

(65) Prior Publication Data

US 2013/0284854 A1    Oct. 31, 2013

Related U.S. Application Data

(62) Division of application No. 12/915,746, filed on Oct. 29, 2010, now Pat. No. 8,485,466, and a division of application No. 12/959,717, filed on Dec. 3, 2010.

(51) Int. Cl.
*B64C 25/50*    (2006.01)

(52) U.S. Cl.
USPC ......... 244/50; 244/51; 244/103 R; 244/103 S

(58) Field of Classification Search
USPC ................ 244/50, 51, 103 R, 103 S
See application file for complete search history.

(56) References Cited

U.S. PATENT DOCUMENTS

| | | | |
|---|---|---|---|
| 3,491,856 A | 1/1970 | Dean | |
| 5,190,247 A | 3/1993 | Le Chatelier | |
| 7,445,178 B2 | 11/2008 | McCoskey et al. | |
| 7,469,858 B2 | 12/2008 | Edelson | |
| 8,191,691 B2 | 6/2012 | Gelb | |
| 2006/0065779 A1* | 3/2006 | McCoskey et al. | 244/100 R |
| 2007/0284478 A1* | 12/2007 | Soderberg | 244/103 R |
| 2007/0284939 A1* | 12/2007 | Charles et al. | 303/152 |
| 2008/0084331 A1 | 4/2008 | Pradler et al. | |

(Continued)

FOREIGN PATENT DOCUMENTS

EP    0756556    9/1999
WO    WO 9529094 A1 * 11/1995

OTHER PUBLICATIONS

"SEMA Technology Promises to Boost Performance of Hybrid Electric Vehicles", Apr. 2001, Infohouse.p2ric.org/ref/46/45690.pdf, http:\\www.ott.doe.gov/success.html.

*Primary Examiner* — Timothy D Collins
*Assistant Examiner* — Nicholas McFall
(74) *Attorney, Agent, or Firm* — Shimokaji & Associates, P.C.

(57) ABSTRACT

A method of taxiing an aircraft with an electric taxi system (ETS) comprising of drive units producing airflow through rotors to pre-cool drive motors and produce rotation of aircraft wheels. The drive motors may be used to produce reverse motion of the aircraft and of operating the drive motors independently of one another so one can operate at a rate of speed and/or direction that is different from the second one of the drive units which may provide enhanced maneuverability of the aircraft during taxiing. The drive motors may be controlled to produce regenerative power producing a deceleration of the aircraft that does not shift a center of gravity of the aircraft.

6 Claims, 7 Drawing Sheets

(56) References Cited

U.S. PATENT DOCUMENTS

| | | |
|---|---|---|
| 2008/0147252 A1 | 6/2008 | Bayer |
| 2009/0114765 A1 | 5/2009 | Cox et al. |
| 2009/0152055 A1* | 6/2009 | Cox .......................... 188/71.6 |
| 2010/0065678 A1 | 3/2010 | Kiyosawa |
| 2010/0147995 A1 | 6/2010 | Cros et al. |
| 2010/0252675 A1 | 10/2010 | Malkin et al. |

* cited by examiner

COMPACT ELECTRIC TAXI ASSEMBLY FOR INSTALLATION ON AN AIRCRAFT

RELATED APPLICATIONS

The present divisional application claims benefit of U.S. application Ser. No. 12/157,746, filed Oct. 10, 2010, and application Ser. No. 12/959,717, filed Dec. 3, 2010, which applications are incorporated herein by reference in their entirety.

BACKGROUND OF THE INVENTION

The present invention generally relates to aircraft landing gear. More particularly, the invention relates to landing gear with integrated electric drive systems to propel an aircraft during taxiing.

A typical aircraft may taxi on to and from runways with thrust force developed by its engines. A significant amount of fuel may be burned by the engines during a typical aircraft taxi profile before and after each flight. In many cases, the main engines may provide more motive force than is required to complete a successful taxi profile. In that regard, engine-thrust taxiing may be considered inefficient and may contribute to high fuel costs and ground level emissions.

Aircraft designers have sought a more efficient method for propelling an aircraft during taxiing. Electric taxi systems (ETS) have been proposed to provide higher efficiency. An ETS may be implemented by using electrical motors to provide the motive force for aircraft taxiing. While this general ETS concept holds promise for improved efficiency, there are practical application problems that need to be addressed in any successful ETS design. For example, it is desirable that an ETS not diminish brake capacity and structural strength of wheels of an aircraft. Also, installation of the ETS should not impact normal take-off and landing procedures or aircraft performance. Additionally, an ETS should not add excessive weight to an aircraft.

As can be seen, there is a need for an ETS which may not adversely impact or interact in any way with the aircraft braking system. Additionally there is a need for an ETS which may not interfere with safe aircraft operation during normal take-off and landing cycles. Also, the ETS system should only minimally impact existing aircraft structures and weight, (e.g., landing gear, landing gear doors, and wheel well configuration).

SUMMARY OF THE INVENTION

In one aspect of the present invention, an electric taxi system (ETS) for an aircraft may comprise drive units mounted coaxially with wheels of the aircraft; motor control units for the drive units; and wherein the motor control units are operable independently of one another so that a first one of the drive units can be operated at a speed different from an operating speed of a second one of the drive units.

In another aspect of the present invention, a drive unit for an ETS may comprise a drive motor positioned coaxially with a wheel of an aircraft; a selectively engageable clutch assembly positioned coaxially with the wheel; and wherein the clutch assembly is positioned internally to the wheel.

In still another aspect of the present invention, a method for taxiing an aircraft with an ETS comprising the steps of: producing airflow through rotors of wheel-mounted drive motors to pre-cool the dive motors; and driving the motors to rotate wheels of the aircraft.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally provides an ETS for an aircraft. The ETS may employ electric motors mounted directly on axles of landing-gear wheels. The motors may be driven with electric power generated by a starter/generator driven by an auxiliary power unit (APU) of the aircraft.

Figure 1:
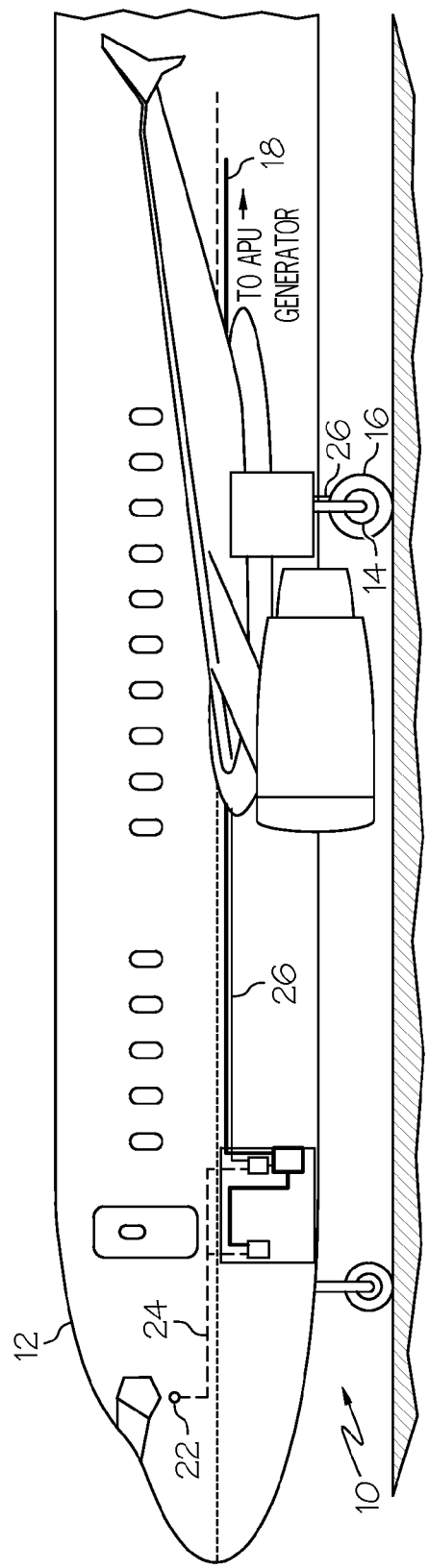
FIG. 1 is a schematic diagram of an electric taxi system (ETS) in accordance with an embodiment of the invention.

Referring now to FIG. 1, an exemplary embodiment of an ETS 10 which may be installed in an aircraft 12 is shown in schematic form. The system 10 may comprise electric drive units 14 mounted on axles of wheels 16. A power feed 18 may carry power from an APU 32 (see FIG. 2) to an ETS power distribution unit 20. A pilot interface unit 22 may be connected to the ETS power distribution unit 20 through an interface cable 24. Upon appropriate commands from a pilot, electric power may be transmitted to the electric drive units 14 through an ETS feeder 26.

Figure 2:
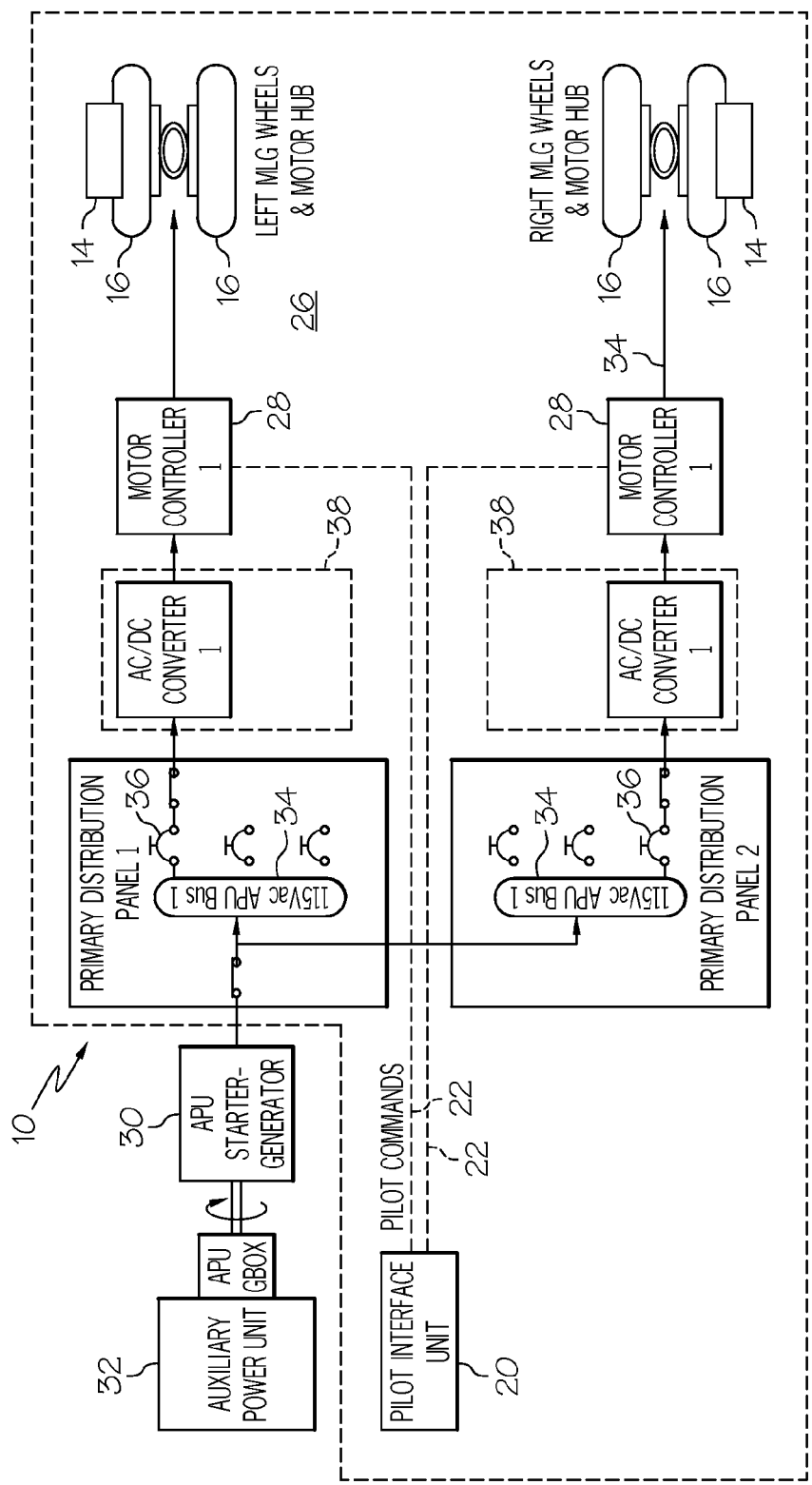
FIG. 2 is block diagram of the ETS of FIG. 1 in accordance with an embodiment of the invention.

Referring now to FIG. 2, a block diagram may illustrate some interconnection features of the ETS 10. The drive units 14 may be mounted directly on outboard ones of the wheels 16. The drive units 14 may be controlled with dedicated motor control units 28. The motor control units 28 may be pilot-controlled from the pilot interface unit 20. Electric power may be supplied to the motor controllers 28 from a starter/generator 30 driven by the APU 32. Power may be supplied through conventional bus bars 34, contactors 36 and dedicated AC/DC converters 38.

Because each of the drive units 14 may be controlled through dedicated motor control units 28, the drive units 14 may be operated independently of one another. For example, a left hand one of the drive units 14 may rotate more slowly that a right hand one of the drive units 14. This may produce left turning of the aircraft 12. In other words, the ETS 10 of the present invention may be used to steer the aircraft 12 during taxiing.

Additionally, a left hand one of the drive units 14 may be rotated counterclockwise while a right hand one of the drive units 14 may be rotated clockwise. In this operational state, the aircraft 12 may be propelled in a forward direction even though both the left and right hand drive units 14 may be engaged with outboard ones of the wheels 16 of the aircraft 12.

The drive units 14 may also be controlled to produce reverse movement of the aircraft 12. In that context, the drive units 14 may be advantageously controlled so that reverse motion of the aircraft 12 is stopped by regenerative braking. By using controlled regenerative braking, the aircraft 12 may be decelerated slowly so that fuel in its tanks does not shift rearward. This may preclude a potential problem associated with reverse movement of aircraft, i.e., a center of gravity of the aircraft shifting rearward if fuel shifts rearward. Such undesirable fuel shifting may cause tilting of the aircraft 12 with a nose wheel lifted from the ground and a tail section resting on the ground.

Figure 3:
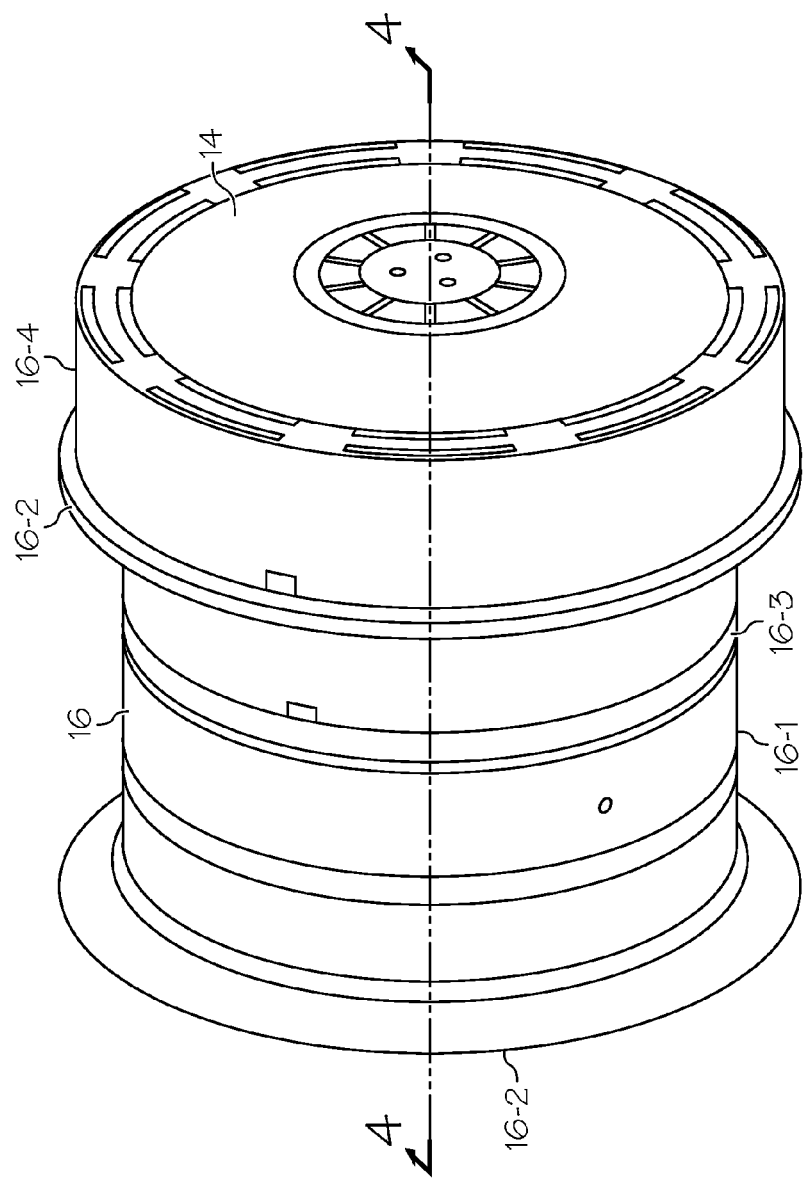
FIG. 3 is a perspective view of a wheel of an aircraft having an attached drive unit in accordance with an embodiment of the invention.

Referring now to FIG. 3, an outboard one of the wheels 16 is shown. For purposes of clarity, the wheel 16 is shown without a tire. The wheel 16 may comprise a hub 16-1 and rims 16-2. In an exemplary embodiment of the invention, the wheel 16 may have a split-hub configuration. The wheel 16 may have a split line 16-3 along which the wheel 16 may be separated for purposes of installing and removing tires. The drive unit 14 may be mounted adjacent an outboard one of the rims 16-2 and coaxially with the wheel 16. Advantageously, the drive unit 14 may have an outside diameter that is no larger than an outside diameter of the rim 16-2.

Figure 4:
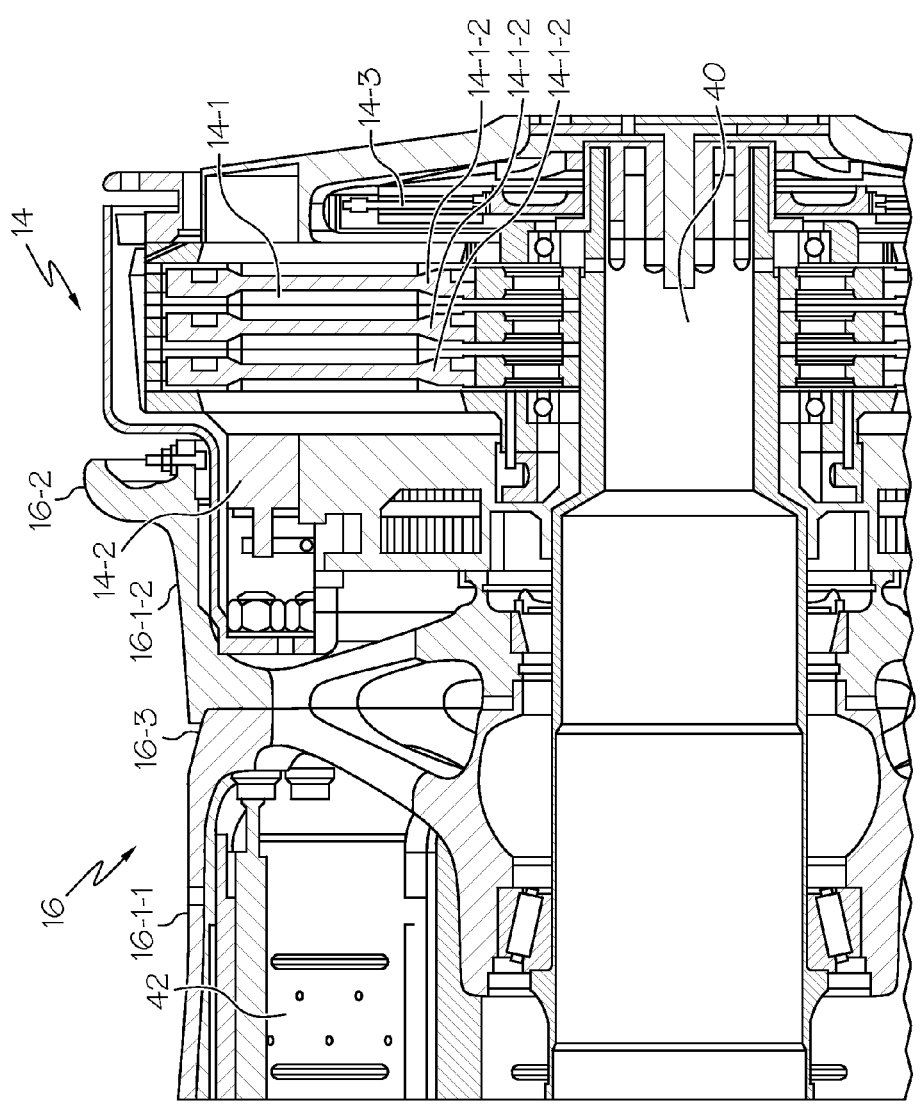
FIG. 4 is a partial sectional view of the wheel and drive unit of FIG. 3 in accordance with an embodiment of the invention.

Referring now to FIG. 4, a partial cross-sectional view of the wheel 16 may illustrate various inventive features of the drive unit 14. The drive unit 14 may comprise a drive motor 14-1 supported concentrically with a wheel axle 40. In that regard, the drive motor 14-1 may be considered to be a wheel-mounted drive motor. Advantageously, the drive motor 14-1 may be a Segmented ElectroMagnetic Array (SEMA) motor. Rotors 14-1-1 of the drive motor 14-1 may be adapted to rotate around the wheel axle 40. The rotors 14-1-1 may be connected to drive a clutch assembly 14-2. The clutch assembly 14-2 may be selectively engageable with the wheel 16. In other words, the wheel 16 may be driven by the drive motor 14-1 when the clutch assembly 14-2 may be engaged. Conversely, when the clutch assembly 14-2 may be disengaged, the wheel 16 and the motor rotor 14-1-1 may be rotatable independently of one another.

In an exemplary embodiment the wheel 16 may have a first hub portion 16-1-1 and a second hub portion 16-1-2. The split line 16-3 may define a location at which the two hub portions 16-1-1 and 16-1-2 may be separated. In FIG. 4, the hub portion 16-1-1 may be shown at a left side of the split line 16-3 and the hub portion 16-1-2 may be shown at a right side of the split line 16-3. A brake assembly 42 may be incorporated into the hub portion 16-1-1. The clutch assembly 14-2 may be located in the hub portion 16-1-2. The motor 14-1 may be located outside of the hub portion 16-1-2 and adjacent the rim 16-2.

The relative positions of the motor 14-1, the brake assembly 42 and the clutch assembly 14-2 may be advantageous for a number of reasons. First of all, the brake assembly 42 may be located in the wheel 16 at a location that is consistent with conventional locations of brake assemblies in many conventional wheel of existing aircraft. Consequently, such conventional wheels may be retro-fitted for ETS operation without reconfiguration of their brake assemblies.

Secondly, conventional aircraft wheels typically have a hollow chamber in their outboard hub portion. In the present embodiment of the invention, the clutch assembly 14-2 may be internally positioned in this otherwise hollow hub portion (i.e., the hub portion 16-1-2). This arrangement provides for a reduced axial projection of the drive unit 14. In other words, the drive unit 14 may extend only a limited axial distance beyond the rim 16-2. In this regard, it may be advantageous to position the drives units 14 in outboard ones of the wheels 16 as shown in FIG. 2. When the wheels 16 are retracted after takeoff, the drive units 14 may be oriented in a downward position. As a consequence, an aircraft may be easily retro-fitted with the inventive ETS because only a limited modification to landing gear doors (not shown) may be needed to accommodate minimally extending drive units 14. If drive units were installed on inboard wheels, an extensive fuselage reconfiguration might be required to accommodate drive units when landing gear is stowed.

An additional advantage of the present embodiment may be that the motor 14-1 may have a diameter larger than an interior of the hub portion 16-1-2. Increasing diameter of a SEMA motor may result in increased torque availability.

It may also be noted that the drive unit 14 may include a blower motor 14-3 which may be operated independently from the drive motor 14-1. Advantageously, the blower motor 14-3 may be a SEMA motor.

Figure 5:
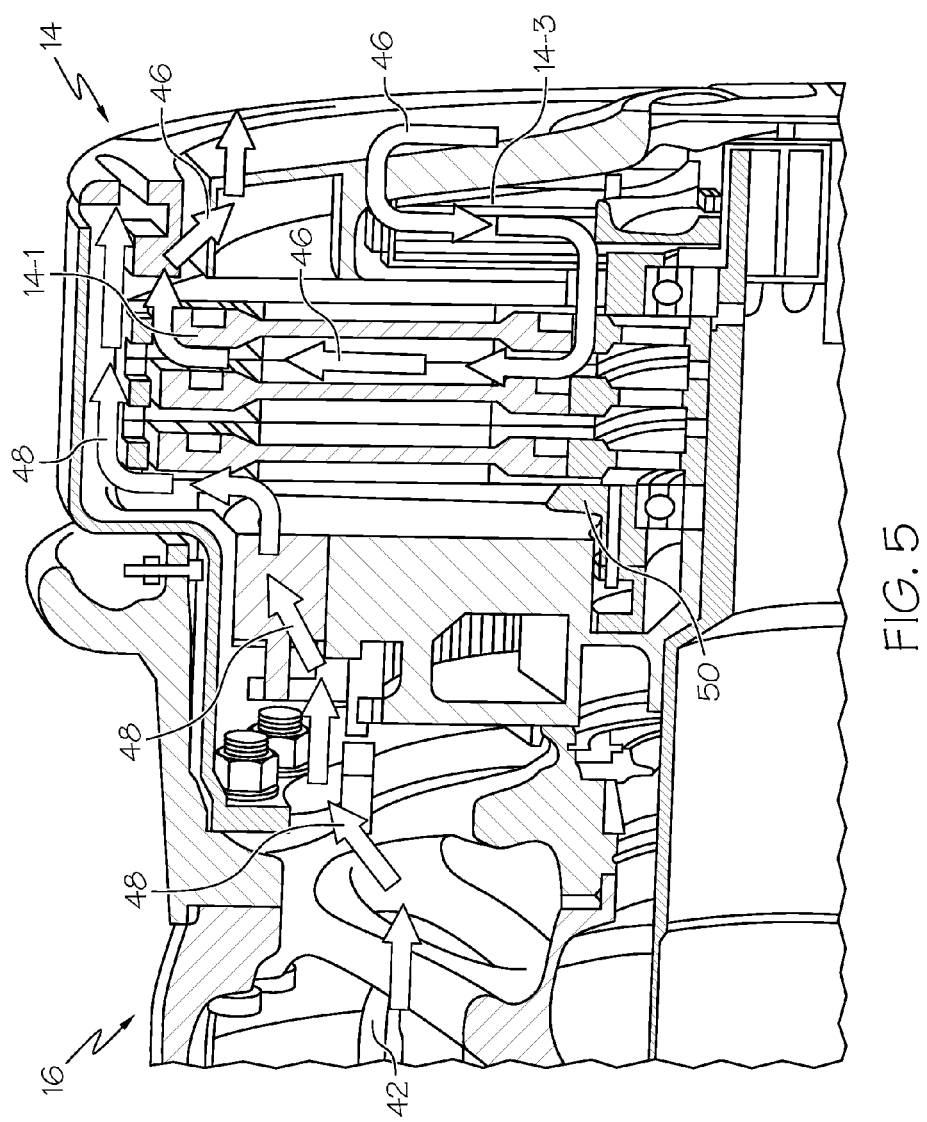
FIG. 5 is an illustration of airflow circuits through the wheel and drive unit of FIG. 3 in accordance with an embodiment of the invention.

Referring now to FIG. 5, a partial sectional view of the drive unit 14 and the wheel 16 may illustrate cooling features of an exemplary embodiment of the invention. A series of shaded arrows may represent a motor cooling airflow circuit 44. A series of unshaded arrows may represent a brake cooling airflow circuit 46.

The blower motor 14-3 may be operated at a desired rotational speed irrespective of the speed at which the drive motor 14-1 may be operated. Consequently, a positive airflow may be induced along the motor cooling airflow circuit 44. The airflow circuit 44 may pass between elements of the rotor 14-1-1 of the drive motor 14-1. As a result of positive cooling, the drive motor 14-1 may be operated with a high torque output even when it may have a low rotational speed. Indeed, the drive motor 14-1 may be safely operated in an overcurrent condition for extended time periods because of cooling produced with the blower motor 14-3. This feature may allow for use of a relatively small and readily stowable drive motor, even though there may be high torque requirements associated with moving the aircraft 12.

Figure 6:
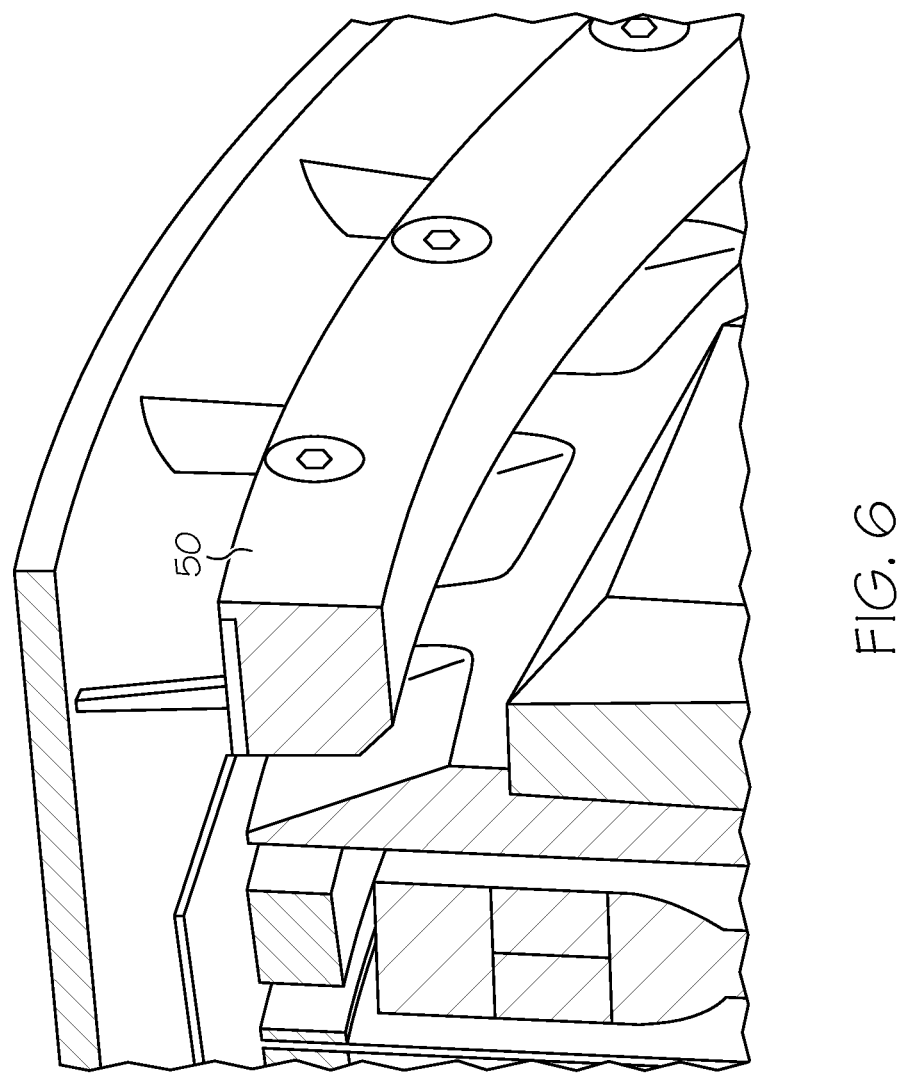
FIG. 6 is an illustration of a fan assembly in accordance with an embodiment of the invention.

The brake cooling airflow circuit 48 may pass through the brake assembly 42 and past the drive motor 14-1 to exit from the drive unit 14. Airflow through the circuit 48 may be positively produced by operation of the drive motor 14-1. A fan blade assembly 50 (See FIG. 6) may be adapted to rotate with the rotor 14-1-1 of the motor 14-1. This arrangement may be particularly useful after an aircraft has arrived and stopped at a gate following a landing. The brake assembly 42 may be hot as a result of braking during landing. When the aircraft stops, the clutch assembly 14-2 may disengage the drive motor 14-1 from the wheel 16 and the drive motor 14-1 may then be operated at a high speed. High speed operation of the drive motor 14-1 may propel the fan blade assembly 50 at a corresponding high speed. Induced cooling airflow may advantageously pass through the brake assembly 42 (along the circuit 48) thereby cooling the assembly.

Referring back now to FIG. 3, it may be seen that a shroud 16-4 may be attached to the wheel 16 and may overlie a portion of the drive unit 14. The shroud 16-4 may be adapted to rotate at the same rotational speed as the wheel 16. The shroud 16-3 may be useful to protect against tire damage during high speed taxiing turns of the aircraft 12. In some high speed turns, a tire (not shown) may deflect so that its sidewall (not shown) may protrude beyond the rim 16-2 of the wheel 16. Moreover, the protruding portion of sidewall may project below the rim 16-2. In this event, the sidewall may come into contact with the shroud 16-4. Contact between the sidewall and the drive unit 14 may be precluded by presence of the shroud 16-4. Without such a feature, the tire might be damaged because the drive motor 14-1 may rotate at a speed different from that of the wheel 16. Contact between the tire and the motor 14-1 may result is damage to the tire.

Figure 7:
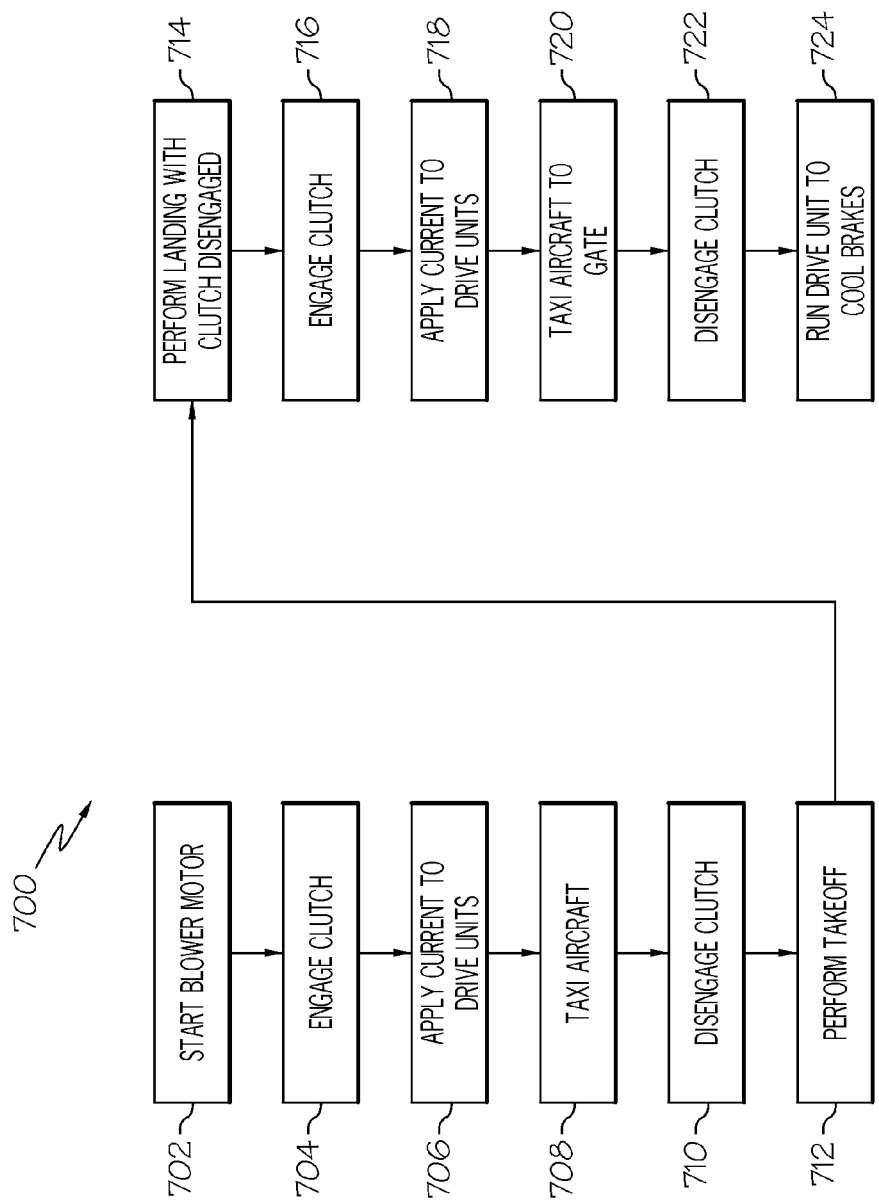
FIG. 7 is a flow chart of a method for taxiing an aircraft with an ETS in accordance with an embodiment of the invention.

Referring now to FIG. 7, a flow chart 700 may illustrate an exemplary method which may be employed to taxi an aircraft with ETS. In a step 702, a blower motor may be started (e.g., a pilot may operate the pilot interface unit 22 to start the blower motor 14-3 of the drive unit 14 to initiate cooling airflow across the rotor 14-1-1 of the drive motor 14-1 to pre-cool the drive motor). In a step 704, the drive unit may be engaged with the wheels by engaging the clutch assembly (e.g., the clutch assembly 14-2 may be engaged so that rotation of the rotors 14-1-1 may impart rotation to the wheels 16). In a step 706, current may be applied to drive units to move the aircraft (e.g., the pilot may operate the pilot interface unit 22 to apply electrical power from the motor control units 28 to the drive units 14 to produce desired rotation of the wheel 16 and movement of the aircraft in either a forward or reverse direction). In a step 708, the aircraft may be taxied to a take-off position. In a step 710, the drive units may be disengaged from the wheels (e.g., the pilot may operate the pilot interface unit 22 to disengage the clutch assembly 14-2). In a step 712 takeoff of the aircraft may be performed in a conventional manner.

In a step 714, landing of the aircraft may be performed in a conventional manner (e.g., landing may be performed with the clutch assembly 14-2 disengaged so that the wheels 16 do not produce rotation of the drive motors 14-1). In a step 716, the drive unit may be engaged with the wheels after the aircraft has stopped on a landing runway (e.g., the pilot may operate the pilot interface unit 22 to engage the clutch assembly 14-2). In a step 718, current may be applied to drive units to move the aircraft (e.g., the pilot may operate the pilot interface unit 22 to apply electrical power from the motor control units 28 to the drive units 14 to produce desired rotation of the wheels 16 and movement of the aircraft). In a step 720, the aircraft may be taxied to a gate. In a step 722, the clutch assembly may be disengaged. In a step 724, the drive motor may be operated to cool the brake assemblies (e.g., the drive motor 14-1 may be operated at a high speed so that the fan assembly 50 may produce cooling air flow through the brake assemblies 42).

It should be understood, of course, that the foregoing relates to exemplary embodiments of the invention and that modifications may be made without departing from the spirit and scope of the invention as set forth in the following claims.

We claim:

1. A method for taxiing an aircraft with an electric taxi system comprising the steps of:
    producing airflow through rotors of drive motors mounted on wheels of the aircraft to pre-cool the drive motors;
    surrounding at least a portion of the drive motors with a shroud, wherein the shroud is configured to rotate at a speed equal to a rotational speed of the wheels, wherein the shroud is disposed between a rim of one of the wheels and one of the drive motors;
    applying controlled current to the drive motors; and
    driving the drive motors to rotate the wheels of the aircraft.

2. The method of claim 1 wherein the step of applying controlled current comprises applying overcurrent to the drive motors.

3. The method of claim 1 wherein the step of applying controlled current to the drive motors produces clockwise rotation of a first one of the drive motors and counterclockwise rotation of a second one of the drive motors.

4. The method of claim 1 further comprising the step of:
    producing cooling airflow through a brake assembly of the wheels after an aircraft has landed and has stopped; and
    wherein the airflow through the brake assembly is produced by rotation of the drive motors and an integral fan assembly with a clutch assembly disengaged.

5. The method of claim 1 further comprising the steps of:
    rotating the drive motors to produce reverse motion of the aircraft; and
    controlling the drive motors to produce regenerative power in order to stop the reverse motion of the aircraft.

6. The method of claim 5 wherein the step of controlling the drive motors to produce regenerative power produces a deceleration of the aircraft that does not shift a center of gravity of the aircraft.

* * * * *